United States Patent [19]

Hagman et al.

[11] Patent Number: 5,691,418

[45] Date of Patent: Nov. 25, 1997

[54] SOFT IONOMER COMPOSITIONS AND BLENDS THEREOF AND USE THEREOF AS GOLF BALL STRUCTURAL MATERIALS

[75] Inventors: John Francis Hagman, Wilmington, Del.; Robert Joseph Statz, Kennett Square, Pa.

[73] Assignee: E. I. Du Pont de Nemours and Company, Wilmington, Del.

[21] Appl. No.: 497,633

[22] Filed: Jun. 30, 1995

Related U.S. Application Data

[63] Continuation-in-part of Ser. No. 345,349, Nov. 21, 1994, abandoned, which is a continuation-in-part of Ser. No. 77,581, Jun. 18, 1993, abandoned.

[51] Int. Cl.$^6$ .......................... A63B 37/06; A63B 37/02; C08L 120/06

[52] U.S. Cl. .......................... 525/196; 525/201; 525/221; 525/330.02; 524/521; 524/522; 473/356; 473/372; 473/376

[58] Field of Search .......................... 525/221, 196, 525/330.2, 201; 273/218, 230; 473/367, 372, 356, 376; 524/521, 522

[56] References Cited

U.S. PATENT DOCUMENTS

| | | | |
|---|---|---|---|
| 3,264,272 | 8/1966 | Rees | 260/78.5 |
| 3,819,768 | 6/1974 | Molitor | 260/897 B |
| 4,690,981 | 9/1987 | Statz | 525/329.6 |
| 4,884,814 | 12/1989 | Sullivan | 273/235 R |
| 5,068,151 | 11/1991 | Nakamura | 525/221 |
| 5,120,791 | 6/1992 | Sullivan | 525/196 |
| 5,155,157 | 10/1992 | Statz et al. | 524/423 |
| 5,244,969 | 9/1993 | Yamada | 525/221 |
| 5,298,571 | 3/1994 | Statz et al. | 525/330.2 |
| 5,324,783 | 6/1994 | Sullivan | 525/221 |
| 5,328,959 | 7/1994 | Sullivan | 525/221 |
| 5,415,937 | 5/1995 | Cadorniga et al. | 428/407 |

FOREIGN PATENT DOCUMENTS

| | | |
|---|---|---|
| 0341731 | 11/1989 | European Pat. Off. |
| 2267908 | 12/1993 | United Kingdom |
| WO95/00212 | 1/1995 | WIPO |

OTHER PUBLICATIONS

Research Disclosure 27221— "Golf Balls based on Li. Ionomers or RD27221 Blends with Li Ionomers" Dec. 1986.
Research Disclosure 27103—"Ionomer Blends for Golf Ball Compositions" RD 27103 Nov. 1986.

Primary Examiner—David Buttner

[57] ABSTRACT

Novel, soft, low modulus ethylene copolymer ionomer compositions containing an acrylate softening monomer, neutralized with magnesium or lithium ions possess a higher level of resilience at a given level of PGA Compressibility than known ionomers. The advantage is maintained in certain blend compositions with harder ionomers for blends having a neat-sphere PGA Compression below about 155. Both unblended and blended compositions will be useful as golf balls and components of golf balls, for one-piece balls, centers, cores and covers of golf balls.

5 Claims, 2 Drawing Sheets

SOFT IONOMER COMPOSITIONS AND BLENDS THEREOF AND USE THEREOF AS GOLF BALL STRUCTURAL MATERIALS

CROSS REFERENCE TO RELATED APPLICATIONS

This Application is a Continuation-in-Part of application Ser. No. 08/345,349, filed Nov. 21, 1994, now abandoned, which is a Continuation-in-Part of application Ser. No. 08/077,581, filed Jun. 18, 1993 and now abandoned.

BACKGROUND OF THE INVENTION

1. Field of the Invention

This invention relates to novel, soft, flexible ethylene copolymer ionomer compositions which have very high resilience. The compositions are useful particularly as component materials in golf balls as well as other uses where high resilience is desirable. The materials can be useful as a primary polymeric material for one-piece golf balls, for centers and cores, and as cover materials for golf balls. The ionomers are copolymers of ethylene, a softening comonomer and (meth)acrylic acid, neutralized with magnesium or lithium. As golf ball materials they possess a combination of flexibility and high resilience. This is an ideal property combination for materials used alone, in blends with other ionomers, or filled, for various parts of a golf ball.

2. Description of Related Art

Ethylene copolymer ionomers based on copolymers of ethylene with (meth)acrylic acid, and optionally a third monomer which could be any of a vast range of monomers, specifically including vinyl acetate, methyl methacrylate and ethyl acrylate, were first disclosed in U.S. Pat. No. 3,264,272 (Rees). The list of metal ions disclosed as possible neutralizing ions. included metals of groups I, II, III, IV-A and VIII of the Periodic Table, including Na, K, Li, Cs, Ag, Hg, Cu, Be, Mg, Ca, Sr, Ba, and many more. Ionomers with a third monomer exemplified included ethylene/vinyl acetate/methacrylic acid neutralized with sodium and magnesium, and ethylene/methyl methacrylate/methacrylic acid neutralized with sodium.

The use of 'soft', flexible ionomers, softened by such a third monomer, only became of commercial interest around 1987. Alkyl acrylates are the preferred softening monomers, vinyl acetate producing a less stable polymer. The employment of n-butyl acrylate as a softening monomer in terpolymer ionomers is disclosed in U.S. Pat. No. 4,690,981 (Statz). This patent lists the possible neutralizing ions as those of groups Ia, Ib, IIa, IIb, IIIa, IVa, VIb and VIII of the periodic table, such as Na, K, Zn, Ca, Mg, Li, Al, Ni and Cr.

U.S. Pat. No. 5,415,939 (Cadorniga et al.), filed Dec. 21, 1993, discloses soft lithium ionomers and blends of such ionomers with hard ionomers. The parent case of which this present application is a continuation-in-part, which was filed Jun. 18, 1993, (i.e., prior to this reference), discloses lithium and magnesium soft ionomers and blends with hard ionomers.

Many other patents have referred to bipolymer and terpolymer ionomers of various metals, also in a general way. No terpolymer ionomer using an alkyl acrylate with (meth) acrylic acid and neutralized with either lithium or magnesium is known to have been specifically disclosed or exemplified. References to them are merely of the shotgun type, such as those described above.

Golf balls have certain measurable properties which, directly, strongly affect play characteristics. Most important of these are resilience and compressibility. High resilience increases the length a golf ball can be driven and compressibility increases the playability in terms of 'spin' and 'feel'. Resilience and compressibility can be measured for the material itself, by testing a sphere of the material. These material properties can affect golf ball play characteristics when the material is used as a material in a one-piece ball, to form the center of a three-piece ball, the core of a two-piece ball, or to form the cover of a ball. For ionomers these two properties, resilience and compressibility, tend to be inversely related. Thus a highly resilient material is generally a harder, less compressible material, and vice versa. There has always been a search for a material which is better than previously known materials with respect to this relationship, or lower cost, or having additional advantages along with a similar balance of these properties.

One characteristic, in relation to golf balls, not related directly to the playability but to the general utility of a ball, is the ball's durability in use. Poor durability is manifest in ball cracking, and cracking at low temperatures is a particular problem. The properties of the material itself will affect golf ball durability significantly when the material is used for one-piece balls or for golf ball covers. They may be less important, but not completely irrelevant, for cores and centers. Balata was an early preferred golf ball cover material because it imparted good spin characteristics with some resilience, as well as good Compression molding characteristics. However Balata covers impart very poor cut resistance to a ball. Ionomers, which generally impart better durability, soon began to take over a significant portion of the market, most particularly for cover materials.

There are a large number of patents relating to use of ionomers as golf ball cover materials, almost all of which are concerned with ionomer blends. These are based on the disclosure that, for certain desirable characteristics, blends show synergistic behavior over single ionomers. Two distinct types of ionomer blends have been disclosed. The first type of blend is that of ionomers neutralized with different metals, and the second is that of blends of hard bipolymer ionomers with soft terpolymer ionomers. The second type of blend may also include the first type of blend; that is to say the soft ionomer may use a different metal ion from the hard ionomer. Interspersed with these combinations is the use of a particular acid as the acid comonomer, generally methacrylic acid or acrylic acid. In some cases, either of these acids has been disclosed as being preferred over the other for some particular utility. In addition, the mount of acid comonomer may have preferred limits, with increasing emphasis on high levels of acid to achieve high resilience. Examples of these patents or publications include the following.

U.S. Pat. No. 3,819,768 (Molitor) disclosed blends of sodium and zinc hard bipolymer ionomers as cover material. Zinc was shown to improve durability in terms of 'coldcrack' resistance. Sodium is generally particularly poor with regard to cold-crack durability.

U.S. Pat. Nos. 4,884,814 (Sullivan) and 5,120,791 (Sullivan), the former terminally disclaimed with respect to the latter, both disclose blends of hard bipolymer and soft terpolymer ionomers, the second patent limiting the soft terpolymer ionomer to acrylic acid based ionomer. The hard ionomers are disclosed as sodium or zinc ionomers, with lithium and magnesium also disclosed in the second patent. The soft ionomers in both are limited to sodium and zinc ionomers. The preferred compositions are sodium zinc blends.

Patent publication WO 95/00212, published Jan. 5, 1995 is the published application of the parent case of the present application. It discloses other blends of hard and soft ionomers. It discloses that the ions used to neutralize soft ionomers may be sodium, zinc, magnesium and lithium. No magnesium or lithium soft ionomers are exemplified.

U.S. Pat. No. 5,298,571 (Statz et al.) discloses blends of hard ionomers of zinc, lithium, sodium and magnesium. Blends of zinc and lithium hard ionomers of high acid copolymers are disclosed as having optimum resilience. The presence of magnesium was shown to be a disadvantage for obtaining the highest resiliency in any blend with any or all of zinc, lithium and sodium ionomers. The polymers disclosed are very hard however, and do not generally fall within the range of flexibility or compressibility of interest for the polymers of the present invention.

Ionomers are disclosed for use as one polymer component of a filled three polymer blend useful for centers, cores and one-piece golf balls in U.S. Pat. No. 5,155,157 (Statz et at.). Both terpolymer and bipolymer ionomers, with various metal ions, are disclosed for use as part of the polymer blend, but bipolymers are preferred in each type of use. Sodium and lithium hard bipolymers are the only polymers exemplified. The ionomers form only one polymer component of a three polymer blend which also included a non-ionomer thermoplastic and an ethylene glycidyl monomer copolymer which acts as a compatibilizing agent for the other two polymers.

In general, lithium ionomers are harder than sodium or magnesium ionomers and zinc produces the softest ionomers. Lithium and magnesium hard ionomers are known, and lithium is a preferred hard ionomer for certain uses. Generally, a virtually unlimited number of ionomer compositions is possible, with any metal, either methacrylic or acrylic or other suitable carboxylic acid, at any level and, for terpolymer ionomers, almost every possible softening monomer. Also possible is an equally unlimited number of blend possibilities. The number of possible compositions, based on combinations of the above variables is enormous. The number which possess particularly desirable qualities is however far more limited. Soft ionomers using an alkyl acrylate softening monomer, methacrylic acid or acrylic acid as the acid, and lithium and magnesium as the neutralizing ion do not appear to have ever been made prior to the present invention. Thus, while broadly disclosed among a vast range of possible ionomers, there has been no recognition that such ionomers were worth making or that they might possess unique properties compared with other ionomers.

There remains a continuing need for soft ionomers, particularly for use as a component in golf balls, which provides the playability imparted by a softer material, yet which imparts an improved level of resilience compared with known soft ionomers. There is also a need for such an ionomer which can impart some of its resilience/playability advantage when blended with hard ionomers when used as a component in golf balls.

SUMMARY OF THE INVENTION

The invention resides in the discovery that lithium and magnesium ions used as the ion in soft ionomers produce ionomers which can show a major increase in the level of compressibility for a given level of resilience or, conversely, a higher level of resilience for the same compressibility. This discovery is magnified even more strongly with acrylic acid ionomers than with methacrylic acid ionomers.

Specifically, there is provided a composition, comprising: a soft, flexible ionomer having a neat-sphere PGA Compression below about 155, prepared from a terpolymer which is a first acid copolymer of a) ethylene, b) from 3 to 40 weight percent of an alkyl acrylate, the alkyl group having from 1 to 8 carbon atoms, and c) from 5 to 25 weight percent of methacrylic acid or acrylic acid, preferably acrylic acid, the ionomer being made by neutralizing 20 to 80 percent of the acid groups of the acid copolymer with magnesium or lithium ions.

In a further embodiment, the invention provides blends of as low as 10 weight percent of above ionomer, based on the blend, with a hard ionomer having a flexural modulus of from 40,000 to 110,000 psi, prepared from a bipolymer which is an acid copolymer of ethylene and from 5 to 25 weight percent of methacrylic acid or acrylic acid, the ionomer made by neutralizing 20 to 80 percent of the acid groups of the acid copolymer preferably with magnesium ions, but also with lithium or sodium ions, provided the neat-sphere PGA Compression of the blend does not exceeed 155. In the case of sodium hard ionomers, there is no more than 50% hard ionomer.

In yet a further embodiment, the invention provides a one-piece golf ball, or core or center made from the above ionomer or ionomer blend, having sufficient inorganic filler to provide a suitable density for the finished ball.

In still a further embodiment, the invention provides a golf ball cover comprising either the above soft ionomer or blend of soft ionomer and hard ionomer.

DETAILED DESCRIPTION OF THE INVENTION

Figure 1:
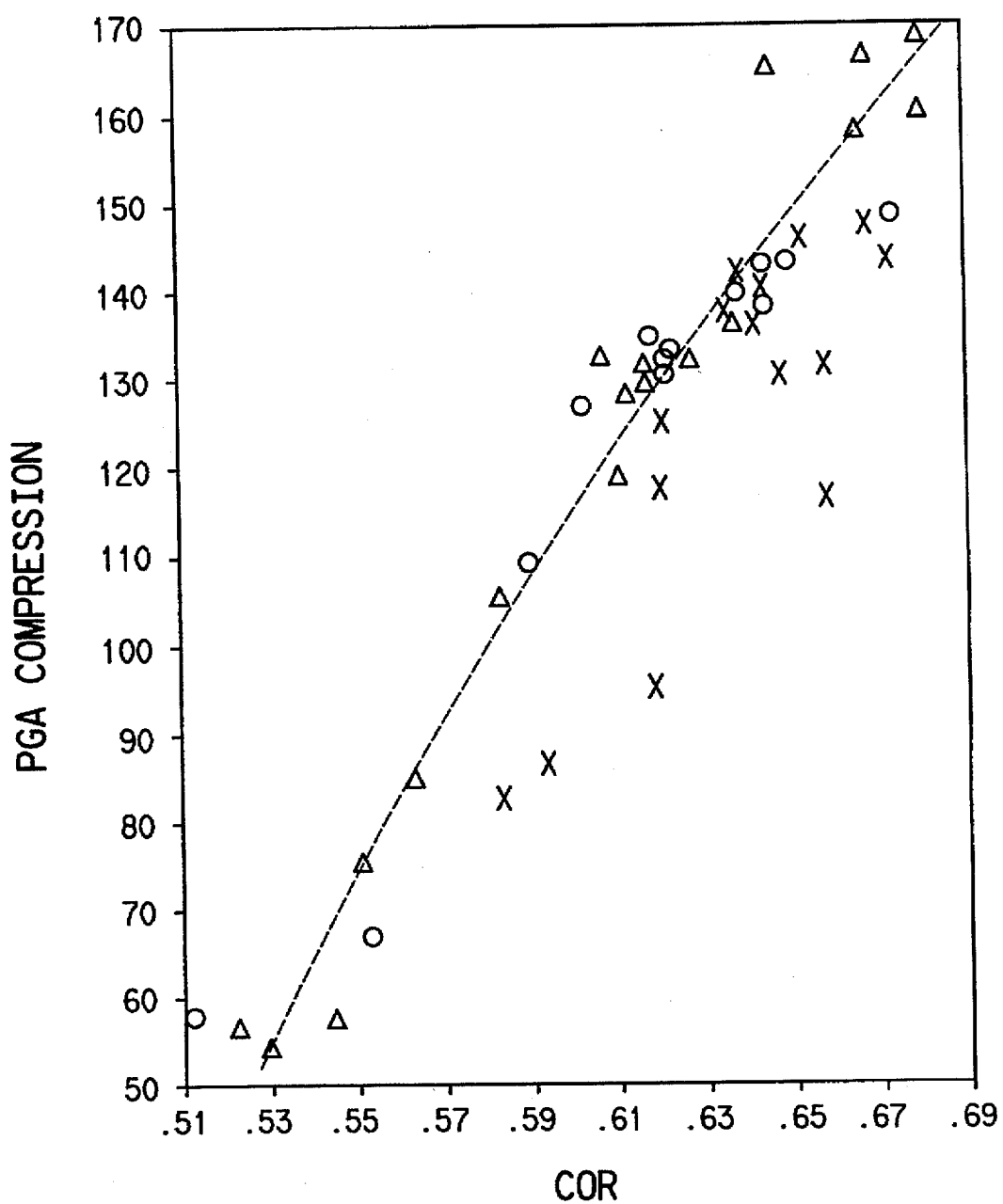
FIG. 1 is a plot of PGA Compression versus COR measured on neat-spheres, showing compositions within the invention compared with other compositions.

In this disclosure, the term copolymer is used to refer to polymers containing two or more monomers. The term bipolymer or terpolymer refers to monomers containing only two or three monomers respectively. The phrase 'copolymer of' (various monomers) means a copolymer whose units are derived from the various monomers.

The ionomers of this invention are prepared from 'direct' acid copolymers, that is to say copolymers polymerized by reacting all monomers simultaneously, as distinct from a graft copolymer, where a monomer or other unit is grafted onto an existing polymer, often by a subsequent polymerization reaction. Methods of preparing ionomers are well known, and are described in U.S. Pat. No. 3,264,272, (Rees) which is hereby incorporated by reference. Methods of preparing the acid copolymers on which the ionomers are based is described in U.S. Pat. No. 4,351,931, which is also incorporated by reference hereby.

The materials of this invention, while useful for other purposes are particularly useful as materials for use in golf balls. This disclosure emphasizes the particular properties of interest in that end use, the excellent properties so revealed showing the uniqueness of these ionomers. In view of the large difference in the particular properties measured from other ionomers, it is believed that other characteristics or properties which related to other particular end uses will also be unique, and thus the compositions will, in many cases, be advantageous for other end uses.

There are different types of golf balls, suited to different levels of playing skill and playing conditions. One goal has been to emphasize resilience, since higher resilience corresponds to greater driving length. Higher resilience is associated with harder balls. Softer balls generally have higher playability or spin. A holy grail has always been to have the best of both worlds, high resilience and high spin. Thus if a softer ball could be made with higher resilience than hitherto, it would be highly desirable. The present invention is directed to softer materials and softer golf balls with high resilience.

A common measure of resilience in the golf ball industry is the Coefficient of Restitution (COR) of the ball. The COR of a 'neat-sphere' of a material however can be a useful guide to the utility of that material for golf ball use, particularly for one-piece balls, but also to covers and even, to some extent, to the material's utility as a component of cores, and centers of balls. However, the COR on a ball clearly depends on the nature of the core, and thus careful choice of the core is necessary.

Because determination of COR has been carried out under a bewildering variety of conditions, comparison with much of the patent or other published data, is difficult. For any particular method however, comparisons of various materials can be meaningfully made using measurements on 'neat-spheres' of the resin. The phrase neat-sphere in this disclosure means spheres molded from the resin alone, without filler or additive.

A good correlation of 'playability' or 'spin' of a ball may be made using a test referred to as 'PGA Compression', which is a standard industry test. It may be carried out on neat-spheres and, like COR, such a determination will be the best characterization of the nature of the material itself. Perhaps confusingly, high values of the numbers referred to as PGA Compression correspond to high hardness and stiffness, or lower compressibility. Use of the word 'Compression' in relation to the PGA test and the general term 'compressibility' should not be confused, since they are inversely related.

The soft ionomers or ionomer blends of this invention will have a PGA Compression value below about 155, based on neat-resin sphere determinations. For golf ball materials, values above 155 are generally too high for the material to provide balls with good spin. Preferably, the materials have a PGA Compression value below about 140. Resins of this invention, with PGA Compression in the 80 to 120 range show the biggest advantage compared with prior art materials. Materials with higher PGA Compression values are in general stiffer, higher modulus materials. While there is no precise correlation between flexural modulus and PGA Compression, resins with flexural modulus of 35,000 psi will have a PGA Compression in the 130 to 160 range. The increased resilience at a given PGA Compression value seen in the materials of this invention may diminish at PGA values above about 130, and above 155 there may be no advantage over conventional prior art ionomers and ionomer blends.

As noted, one other quality is always desirable, and often essential, and that is durability of the material in golf ball structures. Typically this is measured on a finished golf ball, having a cover made of the material, using a repeated impact test, including tests at low temperature. Determination of durability on a neat-sphere is generally not so definitive because of the inherent toughness of many neat resins. The durability measured on spheres consisting of neat resin and filler would, of course, be relevant for one-piece balls. Without at least some durability in a finished ball, high COR and low PGA Compression may be almost without value.

It has now been found, surprisingly, that lithium, the ion which makes the hardest and stiffest of all ionomers, all else being equal, is ideally suited to make an excellent soft ionomer. Magnesium, which also makes one of the harder ionomers, is also ideally suited to make an excellent soft ionomer. Soft ionomers of terpolymer acid copolymers neutralized with these ions have now been found to result in a much improved balance between low PGA Compression and high COR resilience compared with prior art materials. Soft lithium are generally preferred over soft magnesium ionomers in single ionomer compositions used for golf ball construction.

These soft ionomers can also form part of a soft ionomer/hard ionomer blend provided the resulting PGA Compression of the ionomer blend remains below about 155. Typically, this will correspond to a flexural modulus below about 35,000, but the highest flexural modulus is not limited to this value, and may in some cases exceed it. When either soft ionomers alone or soft/hard blends are used in golf ball construction, whether for cores, centers, or one-piece balls, and fillers are used to modify the density of the material to produce a ball with acceptable weight or density, the flexural modulus of the filled material may often exceed 35,000 psi. The PGA Compression of the unfilled material used in the blend however should be below about 155.

The acid copolymer precursors of the soft ionomers of this invention are copolymers of ethylene, from 3 to 40 weight percent of alkyl acrylate, whose alkyl group has from 1 to 8 carbons, and from 5 to 25 weight percent of methacrylic or acrylic acid, preferably from 5 to 15 weight percent. The preferred alkyl acrylate is n-butyl acrylate. It is to be understood that there can be more than one alkyl acrylate and both acrylic and methacrylic acid present, provided the percent limits for alkyl acrylate and acid are met. For this reason, the generic term copolymer is used rather than terpolymer, in referring to the claimed compositions, because terpolymer implies just three monomers. It is also to be understood the acid copolymer may be a blend of different soft acid copolymers having differing levels and/or species of either the softening comonomer, the acid or both. The term 'soft acid copolymer', 'soft flexible ionomer' and the like, encompasses this possibility. Many preparations of copolymers are sufficiently non-uniform in comonomer content from molecule to molecule that such 'copolymers' are, in effect, blends anyway.

Below 3% softening comonomer insufficient softening (modulus reduction) occurs, and above 40% the polymer and resultant ionomer is too soft. From 10 to 30 percent is preferred. Acrylic acid in the soft acid copolymer leads to somewhat more resilient soft ionomers, and is generally preferred.

The total percent neutralization of the acid groups present for magnesium or lithium ions, or both, is from 20 to 80%. Preferably the level is from 25 to 65% and most preferably from 30 to 60%. The modulus of the resulting ionomers will typically be about 5000 to 35,000 psi. The modulus will be higher for lithium than magnesium, and will increase with the level of acid. The modulus will be lower the higher the amount of alkyl acrylate. The modulus of the soft lithium and magnesium ionomers prepared here, ranged from about 5000 to 27000 psi, but it is readily possible to prepare magnesium and lithium terpolymer ionomers with a modulus up to 35,000 psi, and even higher. Certain terpolymer ionomer compositions can be made, such as ones with very high acid, particularly acrylic acid, using lithium ions and with low amounts of alkyl acrylate which will give higher than 35,000 psi flexural modulus. However, provided the PGA Compression of neat-spheres of the ionomer is below about 155, it will be suitable. It is readily within the skill of the artisan to determine which combinations of monomers, neutralization level and acid type will produce ionomer within the required neat-sphere PGA Compression limits.

In the prior art, it has been common often to refer to 'soft' ionomers as possessing a flexural modulus below about 10,000 psi and to 'hard' ionomers as those with modulus above about 30,000 psi. In this disclosure, the terpolymer ionomers with a softening alkyl acrylate termonomer are still referred to as 'soft' even when the flexural modulus is much higher. As noted above, the soft ionomers of this invention can have a flexural modulus of 35,000, and even in some cases above this.

Typically, to achieve modulus values in the region of 35,000 psi, so that the neat-sphere PGA Compression of the ionomer is as high as 155, using prior art soft ionomers such as zinc or sodium soft ionomers it would generally be necessary to blend with a hard ionomer. However, it can be seen from the modulus values in Table 1, that when lithium and magnesium are the neutralizing ions, the flexural modulus values can be considerably higher than those of old art zinc and sodium soft ionomers. For this reason, soft ionomers of the present invention are useful alone, even though they may be blended with hard ionomers, as herein defined. The resilience advantage at a given PGA Compression value in the soft ionomers however, could mean that higher stiffness soft ionomers alone would give as good properties as blends of comparable stiffness. Blending however can offer cost and various other advantages, and in practice, often as much hard ionomer as possible, concomitant with a given level of overall stiffness has been preferred in the past. Blending with hard ionomers could however dilute the resilience advantage at a given PGA Compression value that these unique soft ionomers offer.

Resins within the whole modulus range will be suitable for use in various parts of a golf ball. For covers, the modulus should be preferably above 10,000 psi. and more preferably above 15,000, irrespective of whether using a single soft ionomer or a soft/hard ionomer blend. When the soft ionomer has a modulus much below 10,000 psi, for cover materials it is therefore preferable to blend with a hard ionomer so the final modulus falls within the range 10,000 to 35,000 psi or even somewhat above.

When the soft ionomer is blended with hard ionomer, there should be at least 10 percent soft ionomer, preferably above 25 percent or the advantages of the particular soft ionomers of this invention will not be realized, or will be considerably diluted.

The hard ionomers which may be blended with the soft ionomers are derived from acid copolymers of ethylene and from 5 to 25 weight percent acid where the acid is methacrylic or acrylic acid, or both, preferably from 10 to 22 weight percent. It is to be understood that the hard ionomer may be a blend of more than one hard ionomer each having different levels of and/or different acids in them, just as for the soft ionomer. The term 'hard acid copolymer', and 'hard stiff ionomer' and the like, encompasses this possibility.

When the composition is a hard ionomer/soft ionomer blend, it is preferable for the hard ionomer to have a higher level of acid than the soft ionomer. Higher acid increases the hardness, so that to produce a blend having a specific final blend modulus, the higher the acid level in the hard ionomer, the less of it will be required in the blend. The modulus may range from 40,000 to 110,000 psi. In general, when the composition is a blend containing hard ionomer, the harder or higher modulus the hard ionomer, whether due to acid level, acid type, neutralizing ion or degree of neutralization, the greater the amount of soft ionomer possible in the blend, for a given final blend modulus. Since it is the softer terpolymer ionomers which are here clearly shown to have such an attractive balance of PGA Compression and COR, it may be that the more magnesium or lithium soft ionomer, the higher the resilience, at a given PGA Compression level. The neutralizing ion of any hard ionomer used in a blend is preferably magnesium or lithium but may also be sodium.

Melt index of either the soft or hard ionomers can be from about 0.1 to 30 g/10 min., preferably 0.1 to 10 and most preferably from 0.1 to 6. The melt index of the acid copolymers from which the ionomers are derived may be from about 20 to 350 g./10 min.

When the compositions of the invention are blends, the preferred blends are lithium soft/magnesium hard. Magnesium/magnesium and lithium/lithium blends are also attractive. Magnesium soft/lithium hard blends are generally less preferred, and one such blend showed a diminished resilience advantage compared with the reverse blend. It is not clear why this should be so. However, the preferred soft resins, and those used in the examples, have less acid than the hard resins. Therefore, for a given percent of acid groups neutralized they will have less equivalents of metal present. Thus the number of equivalents of lithium in magnesium soft/lithium hard blends will be higher, when there is more acid in the hard ionomer, than in lithium soft/magnesium hard blends. For blends containing both lithium and magnesium ions therefore, it seems that a higher level of magnesium equivalents is preferable.

As noted, the hard ionomer may also be a sodium ionomer. However, when sodium hard ionomer is blended, there should be 50 weight percent or less of it. Zinc ionomers have, in some instances, shown good properties in blends with lithium soft ionomer though, in general, zinc hard ionomer has not shown as great an advantage.

It has commonly been assumed that ions in an ionomer blend are almost completely labile, and move freely from polymer chain to polymer chain. This may be true for a blend of two ionomers based on the same acid copolymer. However, without commitment in any particular way, it may not be completely true in blends where the underlying acid copolymers of the two ionomers are very different, such as with soft and hard ionomers. Of course, this will be of no consequence if the metal of the soft and hard ionomer are the same. It may be of more consequence when the ions are different. The ions originally associated with the soft ionomer, may, to some extent, tend to remain more associated with the soft ionomer in a blend, and this may produce blends with different properties than blends having the reverse ions in the soft and hard components. However, when the underlying acid copolymer is different, it may merely mean that higher intensity blending is required, such as very high shear extrusion blending, to achieve random distribution of ions throughout the whole composition. In any event, in practice, it has been found that there is a difference in properties in soft/hard blends, when the ions for the soft and hard ionomer are reversed.

When the ionomers or ionomer blends of this invention are to be used for one-piece balls, or for cores or centers of balls, metal oxides or other inert inorganic fillers will need to be added to achieve a density so that the ball weight is within a normal weight range for a golf ball. Fillers such as zinc oxide and barium sulfate are suitable, though any inert inorganic filler can be used. The final density of a ball should be within the range 1.115 to 1.135 g/cc. For one-piece balls therefore, the amount of filler should produce about this density in the material. Cores and centers form only part of a ball. Centers may vary considerably in diameter, and even cores can vary in diameter (corresponding to different thickness covers). Since the weight or density constraint is on the finished ball, the amount of filler for cores and centers will vary depending on their size, and on the material used in the rest of the ball. It will be within the skill of the artisan to determine the amount of a given inorganic filler needed in a core or center to obtain the required ball density knowing the size of the core or center and the thickness and density of the other components, since this amount may be obtained by simple calculation.

For any uses where the ionomer or ionomer blends of this invention form part of the outside of a golf ball, such as in a one-piece ball, or where used as a cover material, the ionomers may also contain conventional additives such as pigments, antioxidants, U.V. absorbers, brighteners and the like.

Testing Methods and Criteria

Flexural modulus is measured using ASTM D790-B, and is measured using a standard 'flex bar' and not on a sphere of material as for most other tests.

Coefficient of Restitution, COR, was measured both on neat-spheres and on finished balls having a cover of the material under test. It is measured by firing, either a covered ball having an the ionomer composition as cover or a neat-sphere of the ionomer composition, from an air cannon at an initial speed of 180 ft./sec. as measured by a speed monitoring device over a distance of 3 to 6 feet from the cannon. The ball strikes a steel plate positioned 9 feet away from the cannon, and rebounds through the speed-monitoring device. The return velocity divided by the initial velocity is the COR.

COR of neat-spheres may fall anywhere between 0.50 and 0.70. The range on useful covered balls of this invention however, is between about 0.67 and 0.74.

PGA Compression is defined as the resistance to deformation of a golf ball, measured using a standard industry ATTI machine. It was measured on a neat-sphere of resin and on balls having a cover of resin. For adequate spin of a ball, when the ionomer is used as a cover material, the PGA Compression, measured on a neat-sphere should be less than about 155, preferably less than 140 and most preferably less than 130.

The PGA Compression of a ball using the resin as a cover is, of course, dependent on the core of the ball. Generally, the PGA Compression of finished bails is much lower than the 155, and is typically in the 80 to 100 range.

Thus on finished balls with the material as cover, the values of COR and PGA Compression fall in a different range than for values for neat-spheres of the material. The desirable PGA Compression of a ball itself is typically in the 80 to 100 range. The PGA Compression/COR correlation for balls is much more attractive than for neat-spheres, as indicated by a vast shift of the line to the right for finished balls. This range can be achieved however, using conventional cores, and cover material having neat-sphere PGA Compression values about in the 110 to 155 range.

Clearly, a one-piece ball, which is a sphere molded from resin and filler and minor quantities of typical additives, will not generally have as good a PGA Compression/COR relation as a ball made from a core and cover. While such one-piece balls would not have the same PGA Compression/ COR relation as neat-spheres, because of the effect of filler, they would have a correlation more akin to that of neat-spheres than to balls with a core. While useful as 'range' balls, such one-piece balls will not have the superior properties of two and three-piece balls. Nevertheless, materials of this invention would still make superior balls having properties in the 'range' ball category. All the materials of the invention will be suitable for one piece balls. However, in view of the fact that filler will raise PGA Compression, it is clear that more flexible materials than for covers can be used.

Melt Index (MI).was measured using ASTM D-1238, condition E, at 190 deg. C., using a 2160 gram weight. Values of MI are in grams/10 minutes.

Durability was measured using a repeat impact test on finished balls, with the material of the invention as the cover, on a Wilson Ultra® conventional solid core. Such cores are believed to be made of 1,4-cis polybutadiene, crosslinked with peroxides and co-crosslinking agents such as zinc (meth)acrylate. Durability is meausred using the same machine as for COR, but using an initial velocity of 175 ft./sec. Durability values are the number of hits to break. Durability at low temperatures is especially desirable, and for this reason, durability tests at −20 ° F. were carried out. While good durability only at room temperature is adequate for golf bails used in some locales, low temperature durability values, preferably above at least 10, as tested under these conditions, is preferred for cold weather use. Durability at room temperature is almost invariably better than durability at −20° F., so that low temperature durability is a guide to the worst performance to be expected. Good durability of a material, based on tests when the material is used as a cover, may indicate good durability for use as a material in a one-piece ball.

EXAMPLES

Table 1 lists various ionomers used in the examples. The list includes soft ionomers which are part of the invention as well as soft ionomers which are not. It also includes hard ionomers which can be part of a blend of this invention as well as hard ionomers which are not. Flexural modulus is shown, if measured. Note that S8 has a modulus of almost 27,000 psi. This is stiff enough even to make a relatively stiff cover material by itself, i.e., without blending with a hard ionomer.

Table 2 lists values of COR and PGA Compression on neat-spheres for the compositions indicated. Comparative examples are numbered with a suffix C. The same values are plotted in FIG. 1. Durability of balls which employed the compositions as a cover on a conventional solid core are also shown, if measured.

FIG. 1 shows comparative examples, outside the invention, indicated by a circle, and examples by a cross. A line is shown, correlating PGA Compression and COR values for prior art materials outside this invention, based on previous data (indicated by triangles), determined prior to this investigation, together with data on prior art materials measured during the present investigation (indicated by a circle). The line is a 'visually best-fit' line, and is based on materials which differed in their ion or ions, their MI, the acid used (whether acrylic of methacrylic), the amount of acid and, in the case of soft ionomer, the amount of acrylate softening monomer. The line is a good fit for data up to a PGA Compression of about 140. Above this, there appears to be a poorer correlation with more scatter in the dam. Of course, the new soft lithium and magnesium ionomers and blends, whether part of this invention or not, are not part of the data on which the line is based, since they are new ionomers.

The fact that such a line can be drawn suggests that, for most ionomers and blends, PGA Compression and COR are uniquely related, largely irrespective of comonomer or ion composition, and depend essentially only on the particular level of stiffness of interest. This is except, of course, for the compositions of the present invention.

Surprisingly, when one examines the data for soft ionomers of magnesium and lithium, and blends of these ionomers with hard ionomers, there is a dramatic shift to the right or to lower PGA values depending on the axis chosen for comparison. Thus, for these soft ionomers, and blends containing these soft ionomers, there is apparently a resilience advantage at a given PGA Compression level and vice versa. This will translate to, at the worst equivalent or slightly better, but generally significantly better compositions for one-piece balls, and for centers and cores and covers for two- or three-piece balls respectively, than previously known compositions. Of course the degree of advantage will depend on which of these golf ball applications is considered.

Zinc has long been known to provide good durability at low temperatures, and compositions of comparative examples which contain zinc are clearly good in low temperature durability as seen from Table 2. Both zinc and sodium soft ionomers alone, generally will have a flexural modulus of 5,000 psi or less however. In general, this will be too flexible to be useful alone for use as materials of this invention. Zinc hard ionomer blended with lithium soft ionomer does seem to provide good compositions when the PGA Compression is above about 140. However, as noted above, the singularity of the correlation becomes less definite at high PGA values.

Sodium hard ionomer is known to provide poor low temperature durability (example 2C and blend 3C). However it can form the hard ionomer portion of blends (example 7), provided there is not more than 50 percent of it.

Lithium soft ionomer is not particularly durable at low temperatures (example 2) though not nearly as poor as sodium (2C). However its effect on increasing COR at a given PGA level in lithium soft ionomer or in blends of this invention can provide good compositions in this respect. Magnesium ionomer as the hard segment provides excellent durability. Magnesium soft/magnesium hard blends can thus provide excellent overall compositions (see Example 8).

For use of the material for golf ball covers, using conventional cores, the advantage can show up in the PGA Compression and COR of the resulting ball itself. However, because the overall PGA Compression and COR is also dependent on the core, not just the cover, the PGA/COR improvment may be somewhat diminished in some cases. Different cores provide somewhat different PGA Compression/COR correlations, so that manipulation of core alone can lead to improved balls. Comparison of cover materials must be made on balls which use the same core. As noted above, the relationship between PGA Compression and COR for golf balls provides a line or lines which is shifted far from that observed for neat-spheres.

Figure 2:
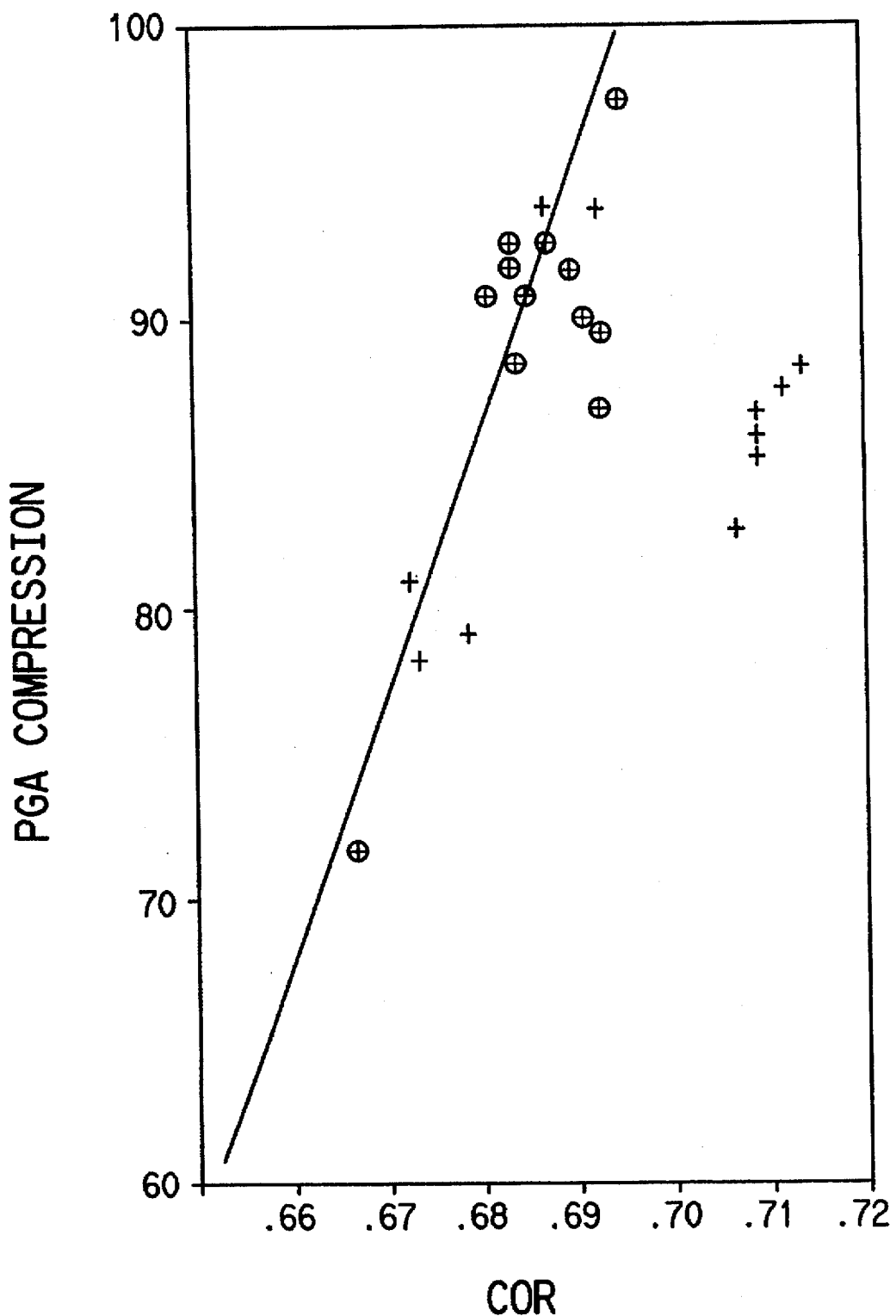
FIG. 2 is a similar plot for the same properties, but measured on golf balls having the compositions as cover material.

Table 3 shows PGA Compression and COR values measured on golf balls having a Wilson Ultra® core, and a cover of the materials having the composition as indicated by the corresponding example number in Table 2. In FIG. 2, the encircled crosses represent finished ball PGA Compression and COR values with prior art covers, and the crosses alone represent values using cover materials of the invention. The line dram is a 'visually-best' line, but there are insufficient data at low PGA values to establish the line with great certainty. It can be seen that, while covers made with soft ionomers alone, which give PGA values in the 78–81 range, appear to show only a small improvment, if any, when blends are tested, giving PGA in the 83–94 range, the improvement, for the most part is dramatic. It is not clear why examples 7 (PGA 94) shows such a low COR value, and why example 8 (also PGA 94) shows only a small improvment. Nevertheless, it is clear that a dramatic improvment is possible.

TABLE 1

COMPOSITION OF IONOMERS

| # | Composition | Monomer Ratios | MI | Ion | Neutr (%) | Flex Modulus |
|---|---|---|---|---|---|---|
| S1 | E/nBA/MAA | 68/23/9 | 0.6 | Zn | ~50 | ~2700 |
| S2 | E/nBA/MAA | 68/23/9 |  | Na | ~50 | 4100 |
| S3 | E/nBA/MAA | 68/23/9 |  | Mg | ~50 | 7100 |
| S4 | E/nBA/MAA | 68/23/9 |  | Li | ~50 | 5000 |
| S5 | E/nBA/AA | 70/22/8 | 1.9 | Mg | ~45 | 7800 |
| S6 | E/nBA/AA | 70/22/8 | 0.4 | Li | ~75 | 9500 |
| S7 | E/nBA/AA | 69.4/18/11.6* | 1.6 | Mg | ~45 | 16700 |
| S8 | E/nBA/AA | 69.4/18/11.6* | 0.5 | Li | ~75 | 26500 |
| H1 | E/MAA | 80/20 | ~1 | Na |  | ~79000 |
| H2 | E/MAA | 85/15 | ~1 | Na | ~57 | 50000 |
| H3 | E/MAA | 85/15 | ~1 | Zn | ~57 | 48000 |
| H4 | E/MAA | 85/15 | ~1 | Mg | ~50 |  |
| H5 | E/MAA | 85/15 | ~4 | Li | ~50 |  |
| H6 | E/MAA | 81/19 | ~4 | Li | ~50 |  |
| H7 | E/MAA | 85/15 | ~4 | Mg | ~50 |  |
| H8 | E/MAA | 85/15 | ~1 | Li | ~50 |  |
| H9 | E/MAA | 80/20 | ~1 | Mg | ~50 |  |
| H10 | E/AA | 80/20 | ~1 | Mg | ~50 |  |

E = Ethylene,
MAA = Methacrylic acid,
AA = Acrylic acid,
nBA = n-Butyl Acrylate.
Flexural Modulus values in psi.
Neutralization values are based on the amount of neutralizing ion in the feed when making the ionomer, assuming complete ionomerization.
*These comonomer contents are based on best data available. Some unconfirmed data have suggested these comonomer contents may be slightly in error.

TABLE 2

PGA COMPRESSION AND COR OF IONOMER COMPOSITIONS

| Ex. # | Composition | Blend Ratio | COR | PGA Compression | Durability Hits/Crack −20° F. |
|---|---|---|---|---|---|
| 1C | S1 | — | 0.511 | 58 |  |
| 2C | S2 | — | 0.553 | 67 | 1 |
| 1 | S3 | — | 0.593 | 86 | 28 |
| 2 | S4 | — | 0.584 | 83 | 8 |
| 3 | S5 | — | 0.618 | 95 | 25 |
| 4 | S6 | — | 0.656 | 116 |  |
| 5 | S7 | — | 0.621 | 126 |  |
| 6 | S8 | — | 0.672 | 144 |  |
| 3C | S1/H1 | 50/50 | 0.637 | 140 | 7 |
| 4C | S1/H2 | 50/50 | 0.645 | 143 | 48 |
| 5C | S2/H3 | 50/50 | 0.619 | 132 | 50 |
| 6C | S3/H3 | 50/50 | 0.602 | 127 | 50 |
| 7C | S4/H3 | 50/50 | 0.621 | 133 | 38 |
| 8C | S5/H3 | 50/50 | 0.619 | 131 | 50 |
| 9C | S6/H3 | 50/50 | 0.645 | 139 | 47 |
| 10C | S7/H3 | 75/25 | 0.618 | 135 | 50 |
| 11C | S8/H3 | 75/25 | 0.674 | 148 | 26 |
| 12C | S3/H3 | 75/25 | 0.590 | 109 |  |
| 7 | S3/H2 | 50/50 | 0.645 | 130 | 22 |
| 8 | S3/H4 | 50/50 | 0.641 | 136 | 50 |

TABLE 2-continued

PGA COMPRESSION AND COR OF IONOMER COMPOSITIONS

| Ex. # | Composition | Blend Ratio | COR | PGA Compression | Durability Hits/Crack -20° F. |
|---|---|---|---|---|---|
| 9 | S3/H5 | 50/50 | 0.647 | 142 | 8 |
| 10 | S3/H6 | 50/50 | 0.654 | 146 | 14 |
| 11 | S3/H7 | 75/25 | 0.620 | 117 | 15 |
| 13C | S1/H2 | 50/50 | 0.650 | 143 | 50 |
| 12 | S4/H4 | 50/50 | 0.644 | 141 | 45 |
| 13 | S5/H8 | 50/50 | 0.638 | 142 | 5 |
| 14 | S5/H4 | 50/50 | 0.634 | 138 | 50 |
| 15 | S6/H9 | 50/50 | 0.668 | 147 | 44 |
| 16 | S6/H10 | 50/50 | 0.633 | 132 | 7 |
| 17 | S6/H9 | 75/25 | 0.655 | 126 | 50 |

TABLE 3

PGA COMPRESSION AND COR OF GOLF BALLS
(Cover composition as in Table 2, Ultra ® Core)

| Ex. # | COR | PGA Compression |
|---|---|---|
| 1 | 0.678 | 79 |
| 2 | 0.673 | 81 |
| 3 | 0.672 | 78 |
| 7 | 0.687 | 94 |
| 8 | 0.681 | 94 |
| 13C | 0.693 | 90 |
| 12 | 0.708 | 83 |
| 13 | 0.709 | 87 |
| 14 | 0.711 | 88 |
| 15 | 0.714 | 89 |
| 16 | 0.708 | 86 |
| 17 | 0.708 | 85 |

We claim:

1. A one-piece golf ball, consisting essentially of;
A a polymer blend consisting essentially of
(i) a first polymeric component, which is a soft, flexible ionomer having a neat-sphere PGA Compression of below about 155, prepared from a first acid copolymer of:
a) ethylene,
b) 3–40 weight percent of an alkyl acrylate or mix of alkyl acrylates, the alkyl groups having from 1 to 8 carbon atoms, and
c) 5–15 weight percent of carboxylic acid which is methacrylic acid or acrylic acid, or a mix of methacrylic and acrylic acid,
the ionomer being made by neutralizing 20 to 80 percent of the acid groups of the first acid copolymer with lithium or magnesium ions or both, and having a melt index of from 0.1 to 30 grams/10 minutes, and
(ii) a second polymeric component which is a hard, stiff ionomer having a flexural modulus of from 40,000 to 110,000 psi, prepared from a second acid copolymer of;
a) ethylene, and
b) 5–25 weight percent of carboxylic acid which is methacrylic acid or acrylic acid or mix of methacrylic and acrylic acid,
the ionomer made by neutralizing 20 to 80 percent of the acid groups of the second acid copolymer with magnesia or lithium ions or both,
with the proviso that the neat-sphere PGA Compression of the polymer blend does not exceed 155,
the polymer blend of (i) and (ii) containing at least 10 weight percent of (i), and
B an inorganic particulate filler in sufficient amount to provide a ball with a density of from 1.115 to 1.135 g/cc.

2. The one-piece golf ball of claim 1 wherein the carboxylic acid of the first polymeric component is acrylic acid, the neutralizing ion of the first polymeric omponent is lithium, and the nuetralizing ion of the second polymeric component is magnesium.

3. A one-piece golf ball, consisting essentially of;
A a polymer blend consisting essentially of
(i) a first polymeric component, which is a soft, flexible ionomer having a neat-sphere PGA Compression of below about 155, prepared from a first acid copolymer of;
a) ethylene,
b) 3–40 weight percent of an alkyl acrylate or mix of alkyl acrylates, the alkyl groups having from 1 to 8 carbon atoms, and
c) 5–15 weight percent of carboxylic acid which is methacrylic acid or acrylic acid, or a mix of methacrylic and acrylic acid,
the ionomer being made by neutralizing 20 to 80 percent of the acid groups of the first acid copolymer with lithium or magnesium ions or both, and having a melt index of from 0.1 to 30 grams/10 minutes, and
(ii) a second polymeric component which is a hard, stiff ionomer having a flexural modulus of from 40,000 to 110,000 psi, prepared from a second acid copolymer of;
a) ethylene, and
b) 5–25 weight percent of carboxylic acid which is methacrylic acid or acrylic acid or mix of methacrylic and acrylic acid,
the ionomer made by neutralizing 20 to 80 percent of the acid groups of the second acid copolymer with sodium ions,
with the proviso that the neat-sphere PGA Compression of the polymer blend does not exceed 155,
the polymer blend of (i) and (ii) containing at least 50 weight percent of (i), and
B an inorganic particulate filler in sufficient amount to provide a ball with a density of from 1.115 to 1.135 g/cc.

4. A golf ball comprising a cover and a core or wound center, the core or center consisting essentially of;
A a polymer blend consisting essentially of
(i) a first polymeric component, which is a soft, flexible ionomer having a neat-sphere PGA Compression of below about 155, prepared from a first acid copolymer of;
a) ethylene,
b) 3–40 weight percent of an alkyl acrylate or mix of alkyl acrylates, the alkyl groups having from 1 to 8 carbon atoms, and
c) 5–15 weight percent of carboxylic acid which is methacrylic acid or acrylic acid, or a mix of methacrylic and acrylic acid,
the ionomer being made by neutralizing 20 to 80 percent of the acid groups of the first acid copolymer with lithium or magnesium ions or both, and having a melt index of from 0.1 to 30 grams/10 minutes, and
(ii) a second polymeric component which is a hard, stiff ionomer having a flexural modulus of from 40,000 to 110,000 psi, prepared from a second acid copolymer of;
a) ethylene, and
b) 5–25 weight percent of carboxylic acid which is methacrylic acid or acrylic acid or mix of methacrylic and acrylic acid,
the ionomer made by neutralizing 20 to 80 percent of the acid groups of the second acid copolymer with magnesium or lithium ions or both, with the proviso that the neat-sphere PGA Compression of the polymer blend does not exceed 155, the polymer blend of (i) and (ii) containing at least 10 weight percent of (i), and B an inorganic particulate filler in sufficient mount to provide a ball with a density of from 1.115 to 1.135 g/cc.

5. The golf ball of claim 4 wherein the carboxylic acid of the first polymeric component is acrylic acid, the neutralizing ion of the first polymeric component is lithium, and the neutralizing ion of the second polymeric component is magnesium.

* * * * *